(12) United States Patent
Pos (10) Patent No.: US 8,840,181 B2
(45) Date of Patent: Sep. 23, 2014

(54) MONITORING/ENTERTAINMENT SYSTEM FOR A CHILD'S SEAT

(75) Inventor: Martin Pos, Bayreuth (DE)

(73) Assignee: Cybex Industrial Ltd., Hong Kong (HK)

( * ) Notice: Subject to any disclaimer, the term of this patent is extended or adjusted under 35 U.S.C. 154(b) by 0 days.

(21) Appl. No.: 13/595,591

(22) Filed: Aug. 27, 2012

(65) Prior Publication Data

US 2013/0049419 A1  Feb. 28, 2013

Related U.S. Application Data

(63) Continuation of application No. 13/157,871, filed on Jun. 10, 2011, now Pat. No. 8,251,445, which is a continuation of application No. 12/373,805, filed as application No. PCT/EP2007/004285 on May 14, 2007, now Pat. No. 7,980,630.

(30) Foreign Application Priority Data

Jul. 26, 2006 (DE) .......................... 10 2006 034 556

(51) Int. Cl.
| | |
|---|---|
| *A47C 31/00* | (2006.01) |
| *B60N 2/48* | (2006.01) |
| *B60N 2/28* | (2006.01) |
| *B60N 2/30* | (2006.01) |
| *B60R 11/02* | (2006.01) |
| *B60R 11/00* | (2006.01) |

(52) U.S. Cl.
CPC .......... *B60R 11/0235* (2013.01); *B60N 2/4876* (2013.01); *B60R 2011/0017* (2013.01); *B60N 2/2863* (2013.01); *B60N 2/286* (2013.01); *B60N 2/3084* (2013.01)

USPC .................. 297/217.1; 297/217.3; 297/217.4; 297/250.1

(58) Field of Classification Search
USPC ...................... 297/217.1, 217.3, 217.4, 250.1
See application file for complete search history.

(56) References Cited

U.S. PATENT DOCUMENTS

| | | | | |
|---|---|---|---|---|
| 3,019,050 | A * | 1/1962 | Spielman | 297/217.3 |
| 4,440,443 | A * | 4/1984 | Nordskog | 297/397 |
| 5,624,156 | A * | 4/1997 | Leal et al. | 297/217.4 |
| 5,775,771 | A * | 7/1998 | La Cour et al. | 297/238 |
| 5,842,715 | A * | 12/1998 | Jones | 280/727 |
| 6,113,454 | A * | 9/2000 | Mitchell | 446/227 |
| 6,199,948 | B1 * | 3/2001 | Bush et al. | 297/217.3 |
| 6,445,408 | B1 * | 9/2002 | Watkins | 348/148 |
| 7,039,207 | B1 * | 5/2006 | Elrod et al. | 381/301 |
| 7,551,100 | B1 * | 6/2009 | Salley et al. | 340/692 |
| 2008/0259475 | A1 * | 10/2008 | Bush et al. | 359/844 |

* cited by examiner

*Primary Examiner* — Laurie Cranmer (74) *Attorney, Agent, or Firm* — Drinker Biddle & Reath LLP (57) ABSTRACT

A monitoring and/or entertainment system, especially for a child seat, having at least one electronic assembly for displaying/recording images, films or film sequences, and having a moulded body in which the at least one electronic assembly is mounted and held. In order that the monitoring/entertainment system can be used for a child seat when the seat shell of the child seat is aligned in the direction opposite to the direction of travel, the moulded body has at least one fixing element which is arranged to form a force-based connection to the base frame of the child seat, wherein when the moulded body is in the state in which it is fixed to the base frame of the child seat the front side of the moulded body and the electronic assembly mounted in the moulded body face towards the seat shell of the child seat.

20 Claims, 5 Drawing Sheets

MONITORING/ENTERTAINMENT SYSTEM FOR A CHILD'S SEAT

CROSS-REFERENCE TO RELATED APPLICATIONS

This application is a continuation of U.S. patent application Ser. No. 13/157,871 filed on Jun. 10, 2011, now U.S. Pat. No. 8,251,445 issued on Aug. 28, 2012, which is a continuation of U.S. patent application Ser. No. 12/373,805 filed on Jan. 14, 2009, now U.S. Pat. No. 7,980,630 issued on Jul. 19, 2011, which is the U.S. national phase of the International Patent Application No. PCT/EP2007/004285 filed on May 14, 2007, which claims the benefit of German Application No. 10 2006 034 556.8 filed on Jul. 26, 2006. This application claims the priority benefit of each of the above applications and patents, the entire content of each of which is incorporated herein by reference.

DESCRIPTION

The present invention relates to a monitoring and/or entertainment system, especially for a child seat, for monitoring and/or entertaining a child sitting in a child seat.

Vehicle seats having an integrated visual display unit are known from the prior art. For example, the specification DE 201 19 410 U1 discloses a vehicle seat having a headrest releasably fixable to a backrest, with a visual display unit being integrated in the headrest. In that arrangement the headrest has a mounting space in which the visual display unit, in the mounted state, is fixed between the headrest and the backrest by an interlocking and force-based connection. This solution known from the prior art is suitable for providing occupants of a motor vehicle with the opportunity of amusing or occupying themselves or of obtaining information, for example during relatively long journeys.

The known solution, however, requires that a headrest provided as standard on the vehicle seat first be removed from the vehicle seat in order that it can be replaced by the headrest having the integrated visual display unit. In the case of vehicle seats in which the headrest is not releasably fixed, such conversion to a headrest having an integrated visual display unit can be carried out only with a great deal of effort, if it can be carried out at all. Furthermore, the known entertainment system is arranged solely to entertain vehicle occupants sitting in the rear seat of the vehicle.

The known entertainment system can be used for entertaining a child sitting in a child seat, if it can be used for that purpose at all, only with limitations. That is particularly the case when the seat shell of the child seat is aligned in the direction opposite to the direction of travel of the vehicle, because in that case the child sitting in the child seat has its back to the visual display unit integrated in the headrest.

A similar solution is known from the specification DE 295 18 369 U1. The entertainment system disclosed in that prior art, however, is integrated in a moulded body which is constructed in such a way that it can be slipped over the standard headrest of a vehicle seat. Although, using that known solution, it is possible for various types of standard headrests to undergo subsequent conversion, even when those headrests are not removable from the vehicle seat, it is likewise not possible to use the known entertainment system in a child seat for entertaining a child sitting in the child seat.

Accordingly, the problem underlying the present invention is to provide a monitoring and/or entertainment system (referred to as a monitoring/entertainment system hereinbelow) which is suitable for a child sitting in a child seat when the seat shell of the child seat is aligned in the direction opposite to the direction of travel.

Starting on that basis, the present invention is based on the problem of defining such a monitoring and entertainment system, it also being made possible to effect simple retrofitting of monitoring and entertainment systems in child seats.

That problem is solved by the features of claim 1. In detail, the monitoring/entertainment system according to the invention has at least one electronic assembly for displaying and/or recording images, films or film sequences, that electronic assembly forming the core of the monitoring/entertainment system. Also provided is a moulded body in which the at least one electronic assembly is mounted and held. The moulded body has at least one fixing element, preferably formed integrally with the moulded body, which fixing element is arranged to form a force-based connection to a base frame of the child seat in order thus to fix the monitoring/entertainment system to the base frame of the child seat. In order that a child sitting in the child seat can be monitored and/or entertained when the seat shell of the child seat is aligned in the direction opposite to the direction of travel, when the moulded body is in the state in which it is fixed to the base frame of the child seat the front side of the moulded body and the at least one electronic assembly mounted in the moulded body face towards the seat shell of the child seat.

The advantages of the solution according to the invention are clearly evident: firstly the electronic assembly, which can have, for example, a flat display screen or the like, is now integrated in a moulded body which merely needs to be fixed to the base frame of the child seat. In that respect, retrofitting to almost any child seat having a suitable base frame can be carried out at any time in order to equip the child seat with the monitoring and/or entertainment functions.

The monitoring/entertainment system as defined in claim 1 is also distinguished by the fact that, to entertain the child sitting in the child seat, the moulded body can be fixed to the child seat in such a way that the front side of the moulded body and, for example, the flat display screen mounted in the moulded body can be attached to the base frame of the child seat so that the child can be entertained even when the seat shell of the child seat is aligned in the direction opposite to the direction of travel.

Preferred developments of the solution according to the invention are defined in the subsidiary claims.

For example, an especially preferred realization of the electronic assembly has at least one camera system, a DVD player, a video-playing system, an MP4 player, direct internet access or some other such media-playing or media-recording system, it being conceivable for the electronic assembly to have a single component or a combination of the above-mentioned components. The provision of a camera system that is integrated in the moulded body of the monitoring/entertainment system makes it possible to monitor, for example, a small child sleeping in the child seat. That is particularly advantageous when, for example, the child seat is arranged in the vehicle in such a way that it is not possible to see into the child seat, as is the case, for example, when the child seat is located on the rear seat of the vehicle and the seat shell of the child seat is aligned in the direction opposite to the direction of travel.

On the other hand, in addition to or alternatively to the camera system it would be conceivable to provide as the electronic assembly a media-playing system that provides a small child sitting in the child seat with the opportunity of being entertained or amused during the journey. Particularly suitable for this purpose is a visual display unit which is, for example, a television receiver, a video player or DVD player or a computer.

Advantageously, the electronic assembly is powered by the in-vehicle power supply. The supply line necessary for that purpose can, for example, be equipped with an adapter plug suitable for connection to the cigarette lighter provided as standard.

In respect of the camera system it should be noted that it communicates, for example by means of a wired connection or wirelessly, with a monitor which is arranged so as to be easily viewable by the driver or passenger in the vehicle. As a possible monitoring monitor there can be used, for example, the display of a navigation system or the rear-view mirror of the vehicle.

For the solution according to the invention it is especially preferable for the moulded body to be constructed in such a way that it is mountable in or on the base frame of the child seat, especially by means of an interlocking connection. This is desirable on the one hand for aesthetic reasons, but on the other hand mounting the monitoring/entertainment system in the child seat base support by means of an interlocking connection provides increased safety, because there are no edges or similar projections protruding into the passenger compartment on which the child or the occupants of the vehicle can injure themselves. Sufficient protection of the IS passengers is thereby ensured. In that respect, comprehensive impact protection, in particular for a small child sitting in front of the monitoring/entertainment system, is also provided.

Advantageously, the at least one fixing element provided on the moulded body for fixing the monitoring/entertainment system by means of a force-based connection to the base frame of the child seat is constructed so as also to facilitate adjustment of the height of the arrangement of the moulded body on the base frame of the child seat. In particular, the at least one fixing element should be constructed in such a way that, on the one hand, a force-based connection and, on the other hand, also an interlocking connection to the base frame of the child seat is formed, and that is the case even when the height of the monitoring/entertainment system has to be adjusted for adaptation purposes. As a result, firstly in principle sufficient protection can be ensured, particularly for the child sitting in the child seat, but secondly it is also ensured that the electronic assembly, which is mounted in the moulded body on the front side of the moulded body, is aligned in the optimum way for a small child sitting in the seat shell of the child seat. That is necessary, in particular, when the electronic assembly has a camera system for monitoring the child sitting in the child seat.

In order that the usability and also the safety of the child seat with the monitoring/entertainment system fitted is not affected, in a preferred development the moulded body is constructed in such a way that when it is in the state in which it is fixed to the base frame of the child seat there is formed between the rear side of the moulded body and the base frame of the child seat a belt-guiding region in which a fastening belt of the child seat is guided. As a result, it is thus possible, in principle, for unimpeded guidance of the fastening belt to be achieved, so that the child seat or the base frame of the child seat can be secured to the vehicle seat in the customary way.

In respect of the at least one fixing element provided on the moulded body, that fixing element preferably has at least one fixing element provided on the upper side of the moulded body for engagement with a substantially horizontally extending edge of the base frame of the child seat and/or at least one fixing element provided on one of the sides of the moulded body for engagement with a substantially vertically extending edge of the base frame of the child seat. By virtue of the provision of a plurality of such fixing elements, which are preferably provided on the periphery of the moulded body, the monitoring/entertainment system can be joined to the base frame of the child seat by means of a force-based connection at a plurality of points. That guarantees, in particular, secure fixing of the system to the child seat.

The expression "edge of the base frame" used herein is to be understood as meaning any component which, for example, is provided as standard on the base frame of the child seat and allows engagement with a fixing element arranged on the moulded body. For example, a reinforcing element provided on the base frame may come into consideration as the edge of the base frame. On the other hand, it is also possible for the edge of the base frame to be a bulbous projection provided on the peripheral region of the base frame. Such bulbous projections are generally provided especially when the base frame of the child seat is a shell-like moulded element.

In order to facilitate engagement of the fixing element provided on the moulded body of the monitoring/entertainment system, the fixing element has suitable profiling in order to be able to engage in a corresponding anchoring element constructed so as to be complementary thereto on the base frame of the child seat. Various solutions come into consideration as possible profiling. For example, it would be conceivable to provide a cramp-like region, that is to say a correspondingly angled connecting element.

On the other hand, another possibility is a snap connection in which the resilience of the material of the fixing element provided on the moulded body is exploited for the connection to an anchoring element constructed so as to be complementary thereto on the base frame of the child seat. In the case of such a snap connection, the fixing element can be resiliently constructed as a wing member. It will be understood that it would also be conceivable, however, to use as a resilient wing member the anchoring element provided on the base frame of the child seat.

Furthermore, it will be understood that the fixing element/anchoring element arrangement can be in the form of a pin/tail arrangement, such as, for example, in the form of a dovetail joint or the like.

In principle, however, the at least one fixing element of the moulded body should be constructed so as to allow a force-based connection to the base frame of the child seat. Such a force-based connection is formed by the application of force which is produced by a suitable bias. The force-based connection holds together purely as a result of the static friction. On the other hand, the fixing element should be arranged also to form an interlocking connection to the base frame of the child seat. An interlocking connection is formed by the engagement one in another of at least two connection partners, such as, for example, a fixing element provided on the moulded body and an anchoring element provided on the base frame of the child seat. In the case of interlocking connection, the forces caused by the working load are transmitted normally, that is to say at a right angle to the faces of the two connection partners. As a result of the mechanical connection, the connection partners cannot be disengaged even without force transmission or when force transmission is interrupted. Suitable fixing elements are known from the prior art and are not described in detail herein.

In order that the monitoring/entertainment system according to the invention can be used with as many different kinds of child seat as possible, without it being necessary to adapt the base frame of the child seat in question accordingly, the at least one fixing element provided on the moulded body of the monitoring/entertainment system is arranged in such a way that it preferably at least partially surrounds the head region of the base frame, that is to say the upper portion of the base frame. Secure fixing of the monitoring/entertainment system to the base frame of the child seat is thus ensured, and that is the case almost independently of the kind of child seat.

As already indicated, it is preferable that the at least one fixing element provided on the moulded body be arranged to form a releasable connection, especially a manually releasable connection, to the base frame of the child seat, so that the monitoring/entertainment system is easily removable from the base frame of the child seat. That is particularly advantageous when the monitoring/entertainment system is to be fixed to the child seat only temporarily. On the other hand, the provision of a releasable connection between the moulded body of the monitoring/entertainment system and the child seat offers the advantageous possibility of easy and uncomplicated retrofitting of such a system to a child seat, without a special tool being required for that purpose. Possible realizations of the fixing elements that have a releasable connection function have been indicated briefly above and are known in principle from the prior art. In particular, however, a snap connection is suitable.

In order that the monitoring/entertainment system according to the invention is suitable for use not just for the case of monitoring and/or entertaining a child sitting in the child seat when the seat shell of the child seat is aligned in the direction opposite to the direction of travel, in an especially preferred development of the system according to the invention the at least one fixing element provided on the moulded body is also arranged in such a way that the monitoring/entertainment system can be fitted to a headrest of a vehicle seat, wherein when the moulded body is in the state in which it is fixed to the headrest of the vehicle seat the front side of the moulded body and the at least one electronic assembly mounted in the moulded body then face towards the seat shell of the child seat when the seat shell of the child seat is aligned in the direction of travel.

That preferred development of the solution according to the invention increases, in particular, the range of use of the monitoring/entertainment system in an extraordinary way. One the one hand the system is suitable for fixing to the base frame of the child seat, so that the child sitting in the child seat can be monitored and/or entertained even when the seat shell of the child seat is aligned in the direction opposite to the direction of travel, but on the other hand that very same system can also be used to monitor and/or entertain the child when the seat shell of the child seat is aligned in the direction of travel. For that purpose it is merely necessary for the moulded body of the monitoring/entertainment system, which is preferably releasably fixed to the base frame of the child seat, to be released from the base frame of the child seat and fitted to the headrest of the vehicle seat. When so doing, it would be conceivable to use the same fixing elements of the moulded body both for fixing to the base frame of the child seat and for fixing to the headrest of the vehicle seat.

As connecting element for this purpose there comes into consideration especially a cramp-like or clip-like connecting member which is joined by its first end to the moulded body and which has, for example, curved or angled shaping, so that its second end can be brought releasably into engagement with the support structure in question (the base frame of the child seat or the headrest of the vehicle seat).

In an especially preferred realization of the connecting element, which can be brought into engagement on the one hand with the base frame of the child seat and on the other hand with the headrest of the vehicle seat, the connecting element has a cramp-like or clip-like connecting member which is in turn in the form of a resilient wing member, the second end of the wing member being so constructed, especially like a hook, that it is able to form a releasable snap connection to the support structure in question.

Alternatively or additionally thereto, it would be conceivable for the at least one fixing element to be constructed in such a way that, on being fixed to the headrest of the vehicle seat, the moulded body surrounds the headrest in a certain way so that the moulded body can be at least partially slipped over the headrest. If nothing else, the result is that the use of the monitoring/entertainment system according to the invention is possible in the case of almost any type of headrest, without it being necessary to effect a complete, time-consuming exchange of the headrests. The solution according to the invention is not limited to vehicle seats in which the headrest is constructed separately from the seat. On the contrary, the system according to the invention is also suitable for use in vehicle seats in which the headrest is formed integrally with the entire vehicle seat.

In a preferred realization of the last-mentioned embodiments, in addition to the at least one fixing element provided on the moulded body of the monitoring/entertainment system there are provided further fixing means which are adjustable especially in respect of different types of vehicle seat headrest and/or types of child seat base support. A possible realization thereof that would come into consideration is an additional fixing means based on a hook-and-loop closure. The hook-and-loop closure is a textile closure means which can be undone almost as often as desired, which consists, for example, of two nylon strips, one of which has small barbs and the other of which has loops. It is known that such hook-and-loop closures, when in the pressed-together state, provide a secure fastening in addition to the fastening provided by the fixing elements.

Preferred embodiments of the monitoring/entertainment system according to the invention are described in detail below with reference to the drawings.

Figure 1:
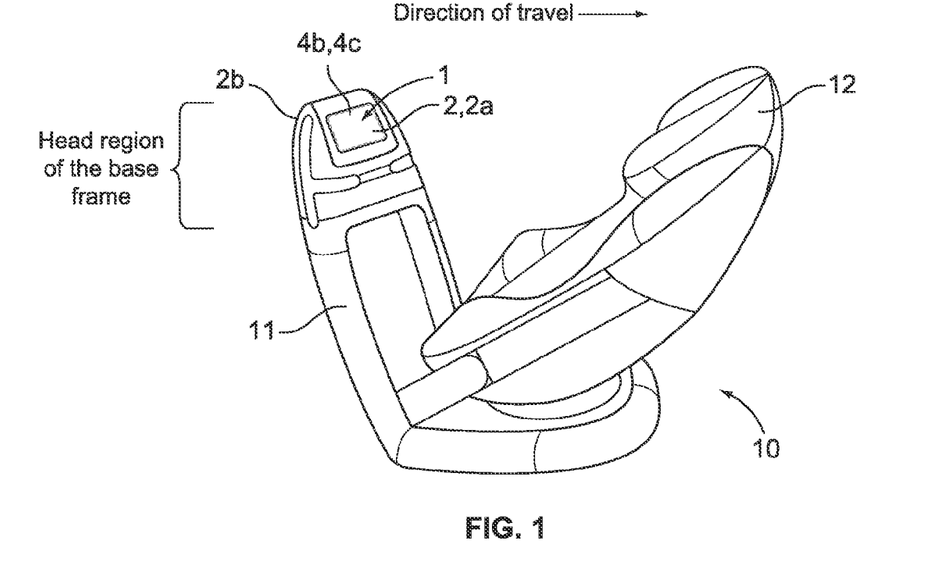
FIG. 1 is a perspective view of a first preferred embodiment of the monitoring/entertainment system according to the invention in the state in which it is fixed to the base support of a child seat.

FIG. 1 shows a first preferred embodiment of the monitoring/entertainment system 1 according to the invention in the state in which it is fixed to a base frame 11 of a child seat 10. In the embodiment shown, the monitoring/entertainment system 1 has as electronic assembly a DVD-playing or video-playing system 4b, 4c, the flat display screen of which can be seen especially in FIG. 1. That media-playing system 4b, 4c is integrated in a moulded body 2. The moulded body 2 itself has fixing elements (not shown explicitly in FIG. 1) which are arranged to form a force-based connection between the moulded body 2 and the base frame 11 of the child seat 10 in order thus to fix the monitoring/entertainment system 1 to the base frame 11 of the child seat 10.

FIG. 1 shows a situation in which the seat shell 12 of the child seat 10 is aligned in the direction opposite to the intended direction of travel. In detail, when the moulded body 2 is in the state in which it is fixed to the base frame 11 of the child seat 10 the front side 2a of the moulded body 2 and the flat display screen 4b, 4c mounted in the moulded body 2 face towards the seat shell 12 of the child seat 10.

Figure 2A:
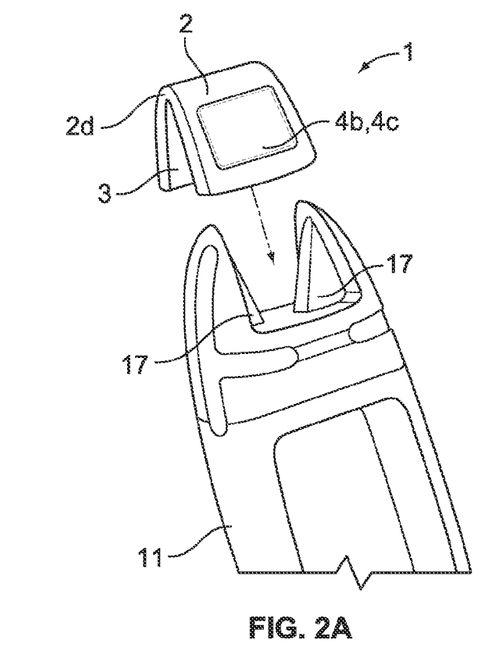
FIG. 2a, b are detail views of the monitoring/entertainment system shown in FIG. 1 at the upper head region of the child seat base support to illustrate the fitting of the monitoring/entertainment system to the base support of the child seat.
Figure 2B:
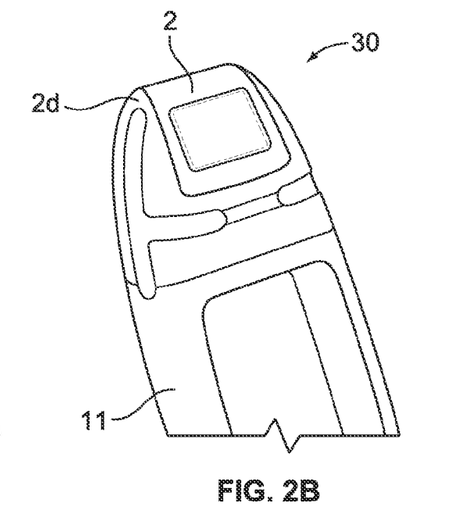

FIGS. 2a and 2b show detail views of the head region of the base frame 11 shown in FIG. 1. In detail, it is made clear therein how the monitoring/entertainment system 1 in accordance with the first preferred embodiment of the present invention can be fixed to the base frame 11 of the child seat 10.

As shown, the moulded body has a fixing element 3 formed integrally with the moulded body 2, which fixing element can be brought into engagement with an anchoring element 17 constructed so as to be complementary thereto on the base frame 11 of the child seat 10 in order to form an interlocking and force-based connection of the moulded body 2 to the base frame 11 of the child seat 10, the fixing element 3 and the anchoring element 17 being constructed so that they engage one in another in order to fix the monitoring/entertainment system 1 to the head region of the child seat base frame 11. It can be seen in FIG. 2a that for that purpose, for example, an appropriately configured tongue and groove arrangement or dovetail arrangement is possible.

FIG. 2b shows a state in which the monitoring/entertainment system 1 has been removed from the head region of the base frame 11 of the child seat and a fascia 30 has been inserted in place of the monitoring/entertainment system 1. With the exception of the electronic assembly 4b, 4c, which is not provided in the case of the fascia 30, the fascia 30 corresponds to the system shown in FIG. 1 and FIG. 2a. That is also the case, in particular, in respect of the construction of a moulded body and in respect of the construction of corresponding fixing elements.

Figure 3:
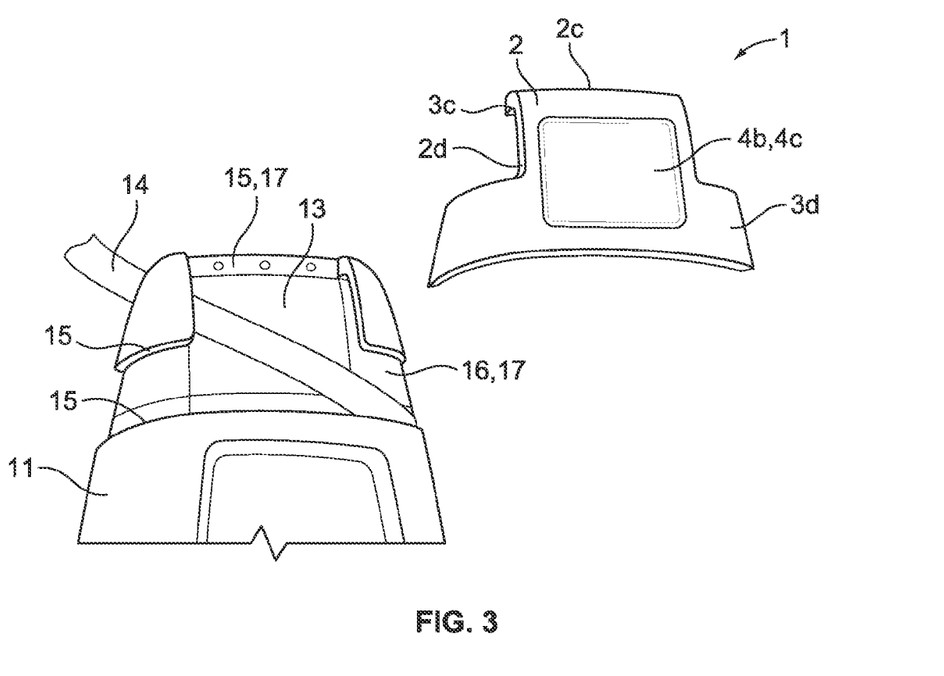
FIG. 3 shows a second preferred embodiment of the monitoring/entertainment system according to the invention for fixing to the base support of the child seat.

FIG. 3 shows a second preferred embodiment of the monitoring/entertainment system 1 according to the invention in a state immediately before the system 1 is fitted to the base frame 11 of the child seat 10 (not shown explicitly in FIG. 3). The monitoring/entertainment system 1 in accordance with the second preferred embodiment again has a moulded body 2 and an electronic assembly 4 for displaying and/or recording images, films or film sequences. As also in the case of the first preferred embodiment according to FIGS. 1 and 2, this electronic assembly 4 is mounted and held in the moulded body 2. Furthermore, on the moulded body 2 there are provided fixing elements 3, preferably formed integrally with the moulded body 2, which are arranged to form a force-based and interlocking connection between the moulded body 2 and the base frame 11 of the child seat. In detail, for that purpose there is provided on the upper side 2c of the moulded body 2 a fixing element 3c for engagement with a substantially horizontally extending edge 15 of the base frame 11 of the child seat 10 and on each of the sides 2d of the moulded body 2 there is provided a fixing element 3d for engagement with a substantially vertically extending edge 16 of the base frame 11 of the child seat 10. The fixing elements 3c, 3d in question have corresponding profiling for engagement in the respective edges 15, 16 of the base frame 11 of the child seat 10, it being conceivable for the base frame 11 to have corresponding bulbous projections 17 in which the respective fixing elements 3c, 3d engage in the mounted state.

It can be seen especially in FIG. 3 that the moulded element 2 with its integrally formed fixing elements has a slightly curved outer surface. As a result, provision is made, in particular, for impact safety. On the other hand, the slight curvature also serves to make it possible for the respective fixing elements 3c, 3d provided on the peripheral region 2c, 2d of the moulded body 2 to be constructed in such a way that they at least partially surround the head region of the base frame 11, which also ensures, in particular, secure fixing of the monitoring/entertainment system 1 to the base frame 11 of the child seat 10.

FIG. 3 also shows that the moulded body 2 is constructed in such a way that when it is in the state in which it is fixed to the base frame 11 of the child seat 10 there is formed between the rear side 2d of the moulded body 2 and the base frame 11 of the child seat 10 a belt-guiding region 13 in which a fastening belt 14 of the child seat 10 is guided. By the provision of such a belt-guiding region 13, the safety and functioning of the child seat 10 is not affected by the installation of the monitoring/entertainment system 1.

Figure 4:
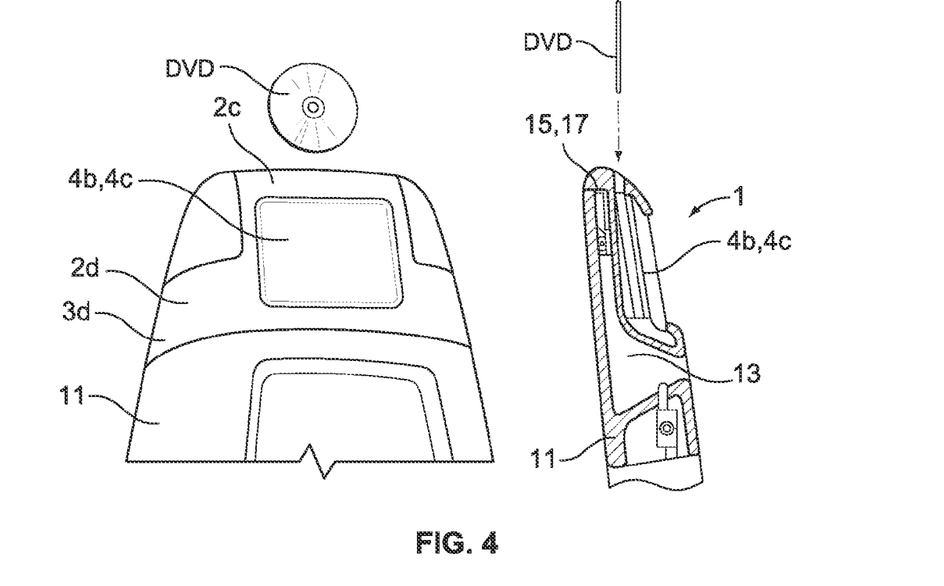
FIG. 4 shows the monitoring/entertainment system in accordance with the second preferred embodiment shown in FIG. 3 in the state in which it is fixed to the base support of the child seat and in longitudinal section.

FIG. 4 shows a possible alternative arrangement of the second preferred embodiment according to FIG. 3 in which a DVD player is used as electronic assembly. As shown, the DVD is insertable into the electronic assembly from the upper side 2c of the moulded body 2. Also shown is a flat display screen for showing images, films or film sequences.

FIG. 4, furthermore, shows, in longitudinal section, the head region of the base frame 11 in a state when the monitoring/entertainment system 1 in accordance with the second preferred embodiment of the present invention is fixed to the base frame 11. In particular, in this longitudinal section it is possible to see the belt-guiding region 13 provided between the rear side 2b of the moulded body 2 and the base frame 11 of the child seat 10. Furthermore, the longitudinal section shows how the fixing element 3c, which is provided on the upper side 2c of the moulded body 2, is in engagement with the substantially horizontally extending edge 15 of the base frame 11 of the child seat 10 in the mounted state.

FIGS. 5a to 5d show further alternative arrangements of the second preferred embodiment of the monitoring/entertainment system 1 according to the invention according to FIGS. 3 and 4, which will be described briefly hereinbelow.

Figure 5A:
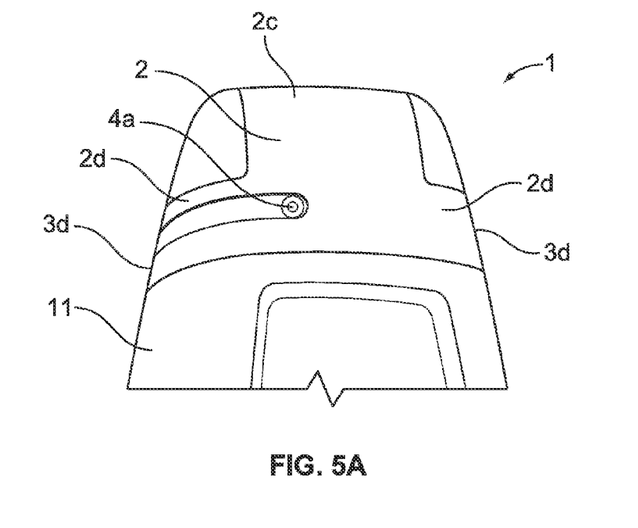
FIG. 5a-5d show possible modifications of the monitoring/entertainment system in accordance with the second preferred embodiment shown in FIGS. 3 and 4.

FIG. 5a shows an embodiment in which solely a camera system 4a is used as electronic assembly. The camera system 4a serves especially for monitoring a child sitting in the child seat (not shown). Advantageously, inside the moulded body there are provided electronic components (not shown) for transmitting the images or film sequences recorded with the camera system 4a by means of a wired connection or wirelessly to a monitoring monitor (likewise not shown) with the aid of which, for example, the occupants sitting in the front seat of the vehicle can observe the child sitting in the child seat.

Figure 5B:
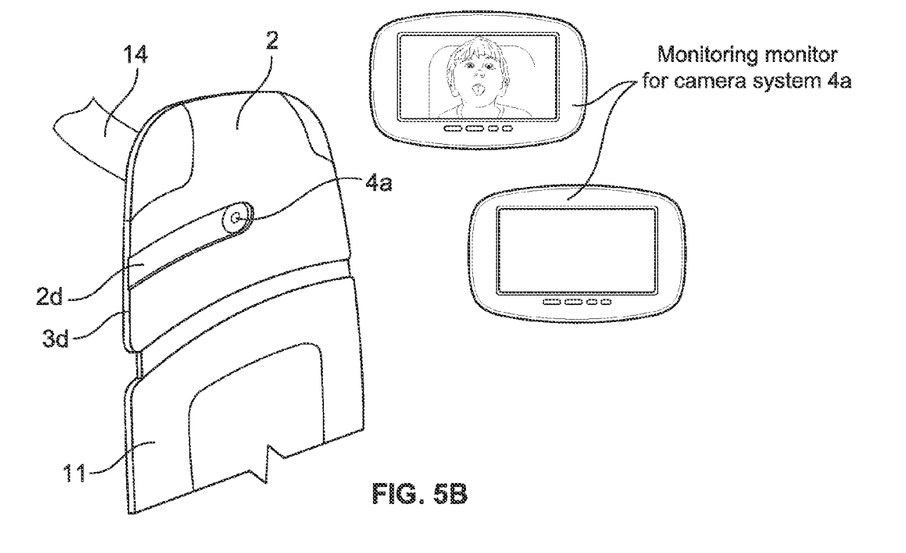

FIG. 5b shows a perspective side view of the embodiment shown in FIG. 5a in which a camera system 4a is used as the electronic assembly, there additionally being shown the monitoring monitors 4e on which the images or film sequences recorded with the camera system 4a are displayed. The data transmission between the camera system 4a and the monitoring monitors 4e can be wired or wireless. Such transmission methods are known as such from the prior art and will not be described in detail herein.

Figure 5C:
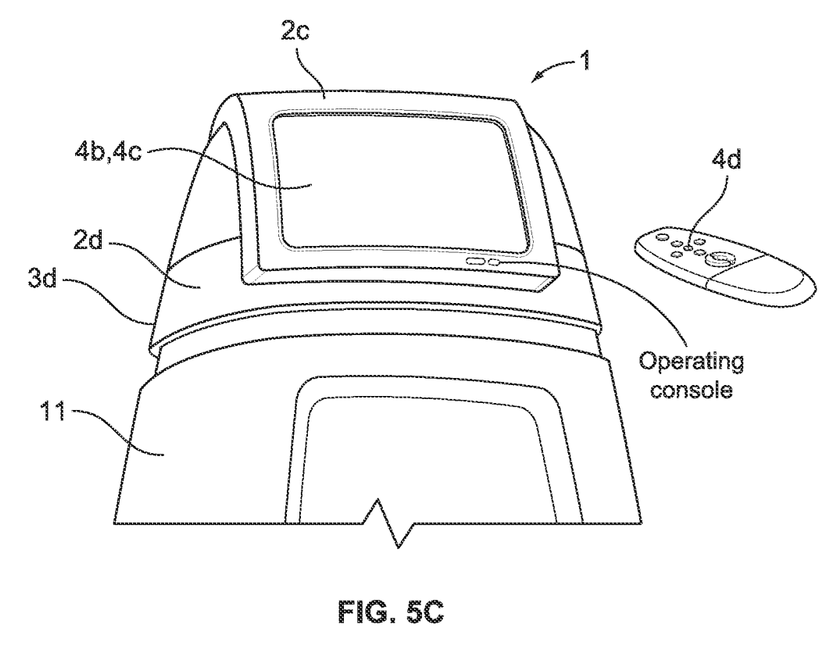

FIG. 5c shows an embodiment in which there is used as electronic assembly a media player 4b, 4c which is controllable by means of a remote controller 4*d*, it being conceivable for the media player 4*b*, 4*c* to be, for example, a combined television and DVD-playing system. The embodiment shown in FIG. 5*b* has the advantage that the program displayed can be selected using the remote controller 4*d*.

Figure 5D:
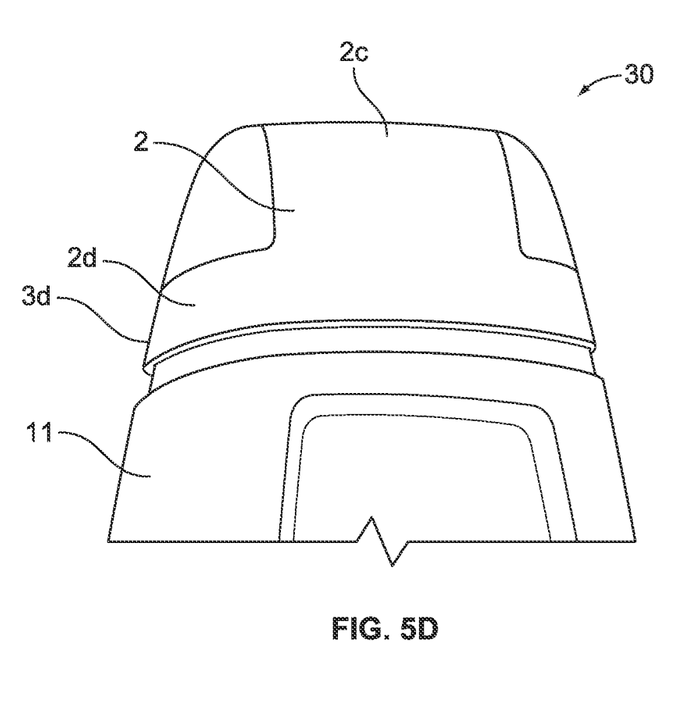

FIG. 5*d* shows a state in which the monitoring/entertainment system 1 has been removed from the head region of the base frame 11 of the child seat and a fascia 30 has been inserted in place of the monitoring/entertainment system 1. With the exception of the electronic assembly 4*a*, 4*b*, 4*c*, which is not provided in the case of the fascia 30, the fascia 30 corresponds to the system shown in FIG. 5*a* and in FIGS. 3 and 4. That is also the case, in particular, in respect of the construction of a moulded body and in respect of the construction of corresponding fixing elements.

Figure 6:
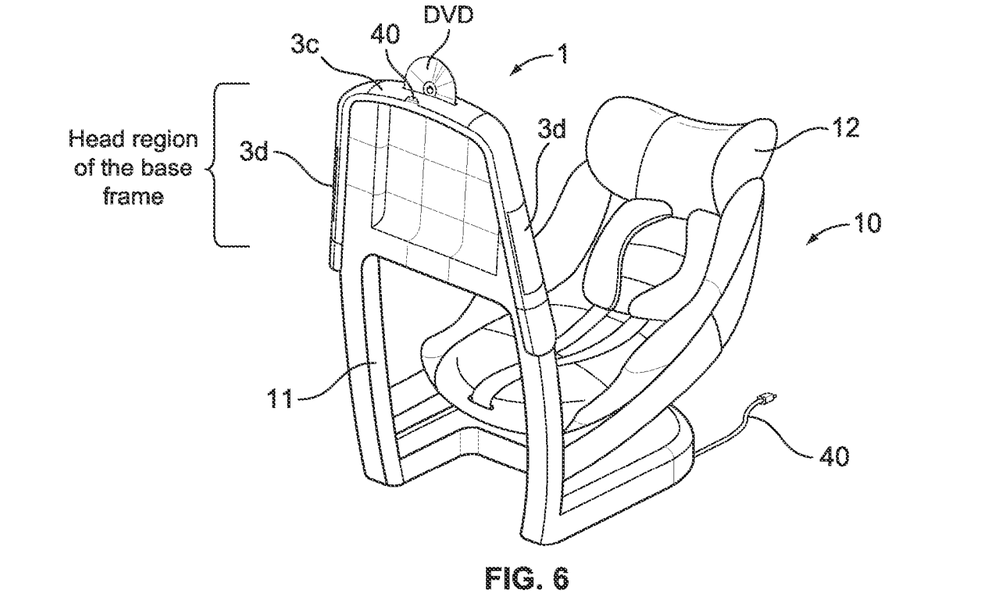
FIG. 6 is a perspective view of a child seat in which the monitoring/entertainment system according to FIG. 4 has been mounted in the upper head region of the base frame.

FIG. 6 shows a perspective view of a child seat in which the monitoring/entertainment system 1 in accordance with the second preferred embodiment described above with reference to FIGS. 3 to 5 is used. It can be seen especially in FIG. 6 that the fixing elements 3 provided on the moulded body 2 of the monitoring/entertainment system 1 partially surround the head region of the base frame 11 of the child seat 10.

All the above-described preferred embodiments and alternative arrangements of the monitoring and/or entertainment system 1 according to the invention are constructed in such a way that the fixing elements 3, with the base frame 11 of the child seat 10, form a releasable connection, especially a manually releasable connection, so that the monitoring/entertainment system 1 is easily removable from the base frame 11 of the child seat 10 without a special tool.

Figure 7:
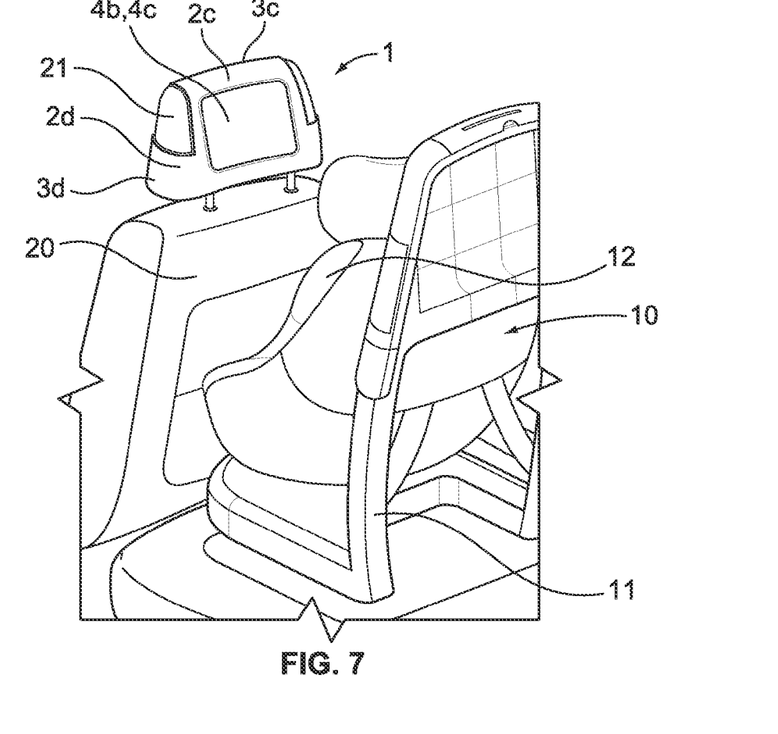
FIG. 7 is a perspective view of the monitoring/entertainment system shown in FIGS. 3 to 6 in the state in which it is mounted on the headrest of the vehicle seat.

FIG. 7 shows a state in which the monitoring/entertainment system 1 in accordance with the second preferred embodiment described above with reference to FIGS. 3 to 6 has been removed from the base frame 11 of the child seat 10 and fitted to a headrest 21 of a vehicle seat 20. In that arrangement, when the moulded body 2 is in the state in which it is fixed to the headrest 21 of the vehicle seat 20 the front side 2*a* of the moulded body 2 and the at least one electronic assembly (here a media-playing system 4*b*, 4*c*) mounted in the moulded body 2 face towards the seat shell 12 of the child seat 10, the seat shell 12 of the child seat 10 being aligned in the direction of travel. In particular, the fixing elements 3 provided on the moulded body 2 are constructed in such a way that fitting of the monitoring/entertainment system 1 to the headrest 21 of the vehicle seat 20 is facilitated, a force-based connection between the monitoring/entertainment system 1 and the headrest 21, i.e. the vehicle seat 20, being achieved.

In addition to the fixing elements 3 it is also possible for further fixing means 5 to be provided, which are only implied in FIG. 7. Those additional fixing means 5 are adjustable especially in respect of various types of vehicle headrest; it would be conceivable to use a hook-and-loop closure system in order thus to reinforce the fixing of the monitoring/entertainment system to the headrest 21 of the vehicle seat 20 still further. It would, of course, also be conceivable, however, for those additional fixing means 5 to be used also for additional fixing of the moulded body 2 to the base frame 11 of the child seat 10.

It should be pointed out that the implementation of the invention is not limited to the exemplary embodiments described in FIG. 1 to 7 but a large number of variants are also possible. In particular, the nature and arrangement of the fixing elements 3 on the moulded body 2 can be different from the arrangements shown.

List Of Reference Numerals

1 monitoring/entertainment system
2 moulded body
2*a* front side of the moulded body
2*b* rear side of the moulded body
2*c* upper side of the moulded body
2*d* side of the moulded body
3 fixing element
3*c* fixing element on the upper side of the moulded body
3*d* fixing element on the side of the moulded body
4 electronic assembly
4*a* camera system (electronic assembly)
4*b*, *c* media player (electronic assembly)
4*d* remote controller
5 fixing means
10 child seat
11 base frame
12 seat shell
13 belt-guiding region
14 fastening belt
15 horizontal edge of the base frame
16 vertical edge of the base frame
17 bulbous projection, anchoring groove
20 vehicle seat
21 headrest
30 fascia

The invention claimed is:

1. A monitoring/entertainment system for a child seat, said monitoring/entertainment system being operative to perform a function selected from the group consisting of monitoring a child sitting in a child seat, entertaining a child sitting in a child seat, and monitoring and entertaining a child sitting in a child seat, said system comprising:
    at least one electronic assembly operative to perform a function selected from the group consisting of displaying images, films or film sequences, recording images, films or film sequences, and displaying and recording images, films or film sequences; and
    a body in which the at least one electronic assembly is mounted and held,
    said body having at least one fixing element adapted to form a force-based connection to a head region of a substantially L-shaped base frame of the child seat in order thus to fix the monitoring/entertainment system to the substantially L-shaped base frame of the child seat,
    wherein when the body is fixed to the substantially L-shaped base frame of the child seat, a front side of the body and the at least one electronic assembly mounted in the body face towards a seat shell of the child seat when the seat shell of the child seat faces towards a direction opposite to a direction of travel of a vehicle in which the child seat is secured, the seat shell being coupled with the substantially L-shaped base frame at a region proximate an end opposite the head region of the substantially L-shaped based frame.

2. The system of claim 1, wherein said at least one fixing element is formed integrally with said body.

3. The system according to claim 1, wherein said electronic assembly includes a system selected from the group consisting of a camera system, a DVD-playing system, a video system, an MP4 player, direct internet access, a media-playing system, and a recording system.

4. The system according to claim 1, wherein the body is constructed in such a way so as to be mountable interlockingly in or on the base frame of the child seat.

5. The system according to claim 1, wherein the body is constructed in such a way that when the body is fixed to the base frame of the child seat, there is formed between a rear side of the body and the base frame of the child seat a belt-guiding region in which a fastening belt of the child seat is guided.

6. The system according to claim 1, wherein the at least one fixing element of the body comprises one or more elements selected from the group consisting of at least one fixing element provided on an upper side of the body for engagement with a substantially orizontally extending edge of the base frame of the child seat, at least one fixing element provided on one of the sides of the body for engagement with a substantially vertically extending edge of the base frame of the child seat, and at least one fixing element provided on the upper side of the body for engagement with a substantially horizontally extending edge of the base frame of the child seat and at least one fixing element provided on one of the sides of the body for engagement with a substantially vertically extending edge of the base frame of the child seat.

7. The system according to claim 1, wherein the at least one fixing element has profiling operative to engage in an anchoring groove provided on the base frame of the child seat.

8. The system according to claim 1, wherein the at least one fixing element is operative to engage in a bulbous projection provided on the base frame of the child seat.

9. The system according to claim 1, wherein said at least one fixing element is constructed so as to at least partially surround the head region of the base frame.

10. The system according to claim 1, wherein said at least one fixing element provided on the body is operative to form a releasable connection to the base frame of the child seat so that the monitoring/entertainment system is removable from the base frame of the child seat.

11. The system according to claim 10, wherein on the body there are provided additional fixing means which are adjustable at least to form a connection of the monitoring/entertainment system to different types of vehicle seat headrest or to different types of child seat base support.

12. A child seat for motor vehicles comprising:
a substantially L-shaped base frame having a head region proximate an upper end of a substantially vertically-extending portion of the base frame and a seat region proximate a distal end of a substantially horizontally-extending portion of the base frame;
a seat shell coupled with the substantially L-shaped base frame at the seat region to seat a child;
a monitoring/entertainment system being operative to perform a function selected from the group consisting of monitoring a child sitting in the seat shell, entertaining a child sitting in the seat shell, and monitoring and entertaining a child sitting in the seat shell, said system comprising:
at least one electronic assembly operative to perform a function selected from the group consisting of displaying images, films or film sequences, recording images, films or film sequences, and displaying and recording images, films or film sequences; and
a body in which the at least one electronic assembly is mounted and held, the body having at least one fixing element adapted to form a force-based connection to the head region of the substantially L-shaped base frame of the child seat in order to fix the monitoring/entertainment system to the substantially L-shaped base frame of the child seat;
wherein when the body is fixed to the substantially L-shaped base frame, a front side of the body and the at least one electronic assembly mounted in the body face toward the seat shell when the seat shell faces toward a direction opposite to a direction of travel of a vehicle in which the child seat is secured.

13. The child seat of claim 12, wherein said electronic assembly includes a system selected from the group consisting of a camera system, a DVD-playing system, a video system, an MP4 player, direct internet access, a media-playing system, and a recording system.

14. The child seat of claim 12, wherein the body is constructed in such a way so as to be mountable interlockingly in or on the base frame of the child seat.

15. The child seat of claim 12, wherein the body is constructed in such a way that when the body is fixed to the base frame of the child seat, there is formed between a rear side of the body and the base frame of the child seat a belt-guiding region in which a fastening belt of the child seat is guided.

16. The child seat of claim 12, wherein the at least one fixing element of the body comprises one or more elements selected from the group consisting of at least one fixing element provided on an upper side of the body for engagement with a substantially horizontally extending edge of the base frame of the child seat, at least one fixing element provided on one of the sides of the body for engagement with a substantially vertically extending edge of the base frame of the child seat, and at least one fixing element provided on the upper side of the body for engagement with a substantially horizontally extending edge of the base frame of the child seat and at least one fixing element provided on one of the sides of the body for engagement with a substantially vertically extending edge of the base frame of the child seat.

17. The child seat of claim 12, wherein the at least one fixing element has profiling operative to engage in an anchoring groove provided on the base frame of the child seat.

18. The child seat of claim 12, wherein the at least one fixing element is operative to engage in a bulbous projection provided on the base frame of the child seat.

19. The child seat of claim 12, wherein said at least one fixing element is constructed so as to at least partially surround the head region of the base frame.

20. The child seat of claim 12, wherein said at least one fixing element provided on the body is operative to form a releasable connection to the base frame of the child seat so that the monitoring/entertainment system is removable from the base frame of the child seat.

* * * * *